Sept. 11, 1956  L. A. HUNZIKER  2,762,170
APPARATUS FOR RECONDITIONING CHAIN SAW BARS
Filed June 21, 1954

INVENTOR.
Louis A. Hunziker
BY
Cook and Schermerhorn
ATTORNEYS

United States Patent Office 2,762,170
Patented Sept. 11, 1956

2,762,170

APPARATUS FOR RECONDITIONING CHAIN SAW BARS

Louis A. Hunziker, Kelso, Wash.

Application June 21, 1954, Serial No. 438,272

10 Claims. (Cl. 51—96)

The present invention relates to an apparatus for reconditioning work pieces and is especially applicable for operation on saw bars of the type used on portable chain saws.

Portable chain saws are equipped with elongated saw bars or blades having a peripheral edge groove, the side rails of the groove serving as tracks for an endless chain saw. The endless chain saw has a plurality of lugs guided in said groove and is actuated by a driven sprocket at one end of the saw bar. The free outer end of the bar is rounded to guide the chain therearound, and, because of the tension of the chain, this outer end is subject to the greatest abuse and wear relative to other parts of the bar during a sawing operation. Furthermore, the rails of the groove which serve as tracks for the chain saw often wear unevenly whereby the edge of one rail will become worn to a greater extent than the edge of the other rail, causing the endless chain saw to tilt out of the plane of the saw bar and resulting in unsatisfactory operation. Because of the rapid and uneven wearing of these certain portions of a saw bar, it is often necessary to replace the worn saw bars, resulting in expensive operation of the portable chain saw.

The worn saw bars may be reconditioned by replacing the worn outer rounded end of the saw bar by adding a sufficient amount of special wear resistant metal, as by application of a welding rod thereto, to restore the bar to its original length and thickness. Thereupon, a grinding wheel is applied to the renewed end of the bar to remove excess material and restore the arc of the original bar, as well as to reestablish the groove in the rebuilt end.

The instant invention is directed to the provision of an apparatus particularly adapted to the accomplishment of the several operations necessary to rebuild worn saw bars. The apparatus is so constructed that a single motor drives a plurality of grinding wheels, each grinding wheel being mounted as an adjunct to a work supporting table or surface upon which the saw bar is mounted for presentation to the particular grinding wheel. When a selected work table and grinding wheel is in position for the performance of a particular operation, the other work table and inactive grinding wheel is rotated to an inoperative, out-of-the-way position. An important structural feature of the apparatus is the provision of a rotatably supported shaft forming an axis about which all of the working parts of the apparatus may be rotated. By this means work supporting surfaces and grinding wheels may be rotated through operative and inoperative positions as is necessary to perform operations on the saw bar.

It is, therefore, a principal object of the present invention to provide an apparatus for reconditioning worn chain saw bars and other work pieces, obviating the necessity of purchasing a new saw bar when wear has impaired the operation of one in use.

Another object of the present invention is to provide an apparatus for reconditioning worn chain saw bars which is a unitary structure capable of performing various operations on said saw bar.

Another object is to provide a machine of the character above referred to which is of compact and simplified design and which presents a plurality of tools in readily accessible positions for operations on the saw bar.

Other objects are to provide a machine for reconditioning chain saw bars utilizing a single electric motor for driving a plurality of grinding wheels, each grinding wheel being mounted as an adjunct to a work supporting table, each said grinding wheel and table being rotatable through operative and inoperative positions as may be necessary to perform operations on the saw bar; to provide work tables and powered tools such as abrasive wheels and saws adapted to pivot as an integral unit between two operable positions whereby a horizontal work supporting surface is provided for each operation to be performed on said saw bar; to provide means for adjustably moving said tools in an axial direction; and to provide means in conjunction with one of said work supporting surfaces pivotally to mount a saw bar thereon and progressively move said saw bar into engagement with one of said tools.

The invention is embodied in a novel apparatus supported by an upright framework and comprises, in general, individual work tables mounted in conjunction with a pair of grinding wheels driven by a double ended motor shaft whereby the work supported on the work tables can be brought into engagement with the grinding wheels in a plurality of reconditioning steps to be hereinafter explained. The motor mechanism and work tables are pivotally mounted on the framework and are adapted to be rotated between two operative positions as an integral unit whereby a horizontal work surface is available, as desired, for a particular operation to be performed on the saw bar.

The invention will be better understood and additional objects become apparent from the following description taken in connection with the accompanying drawings which illustrate a preferred form of the device. It is to be understood, however, that the invention may take other forms, and that all such modifications and variations within the scope of the appended claims which will occur to persons skilled in the art are included in the invention.

Figure 3:
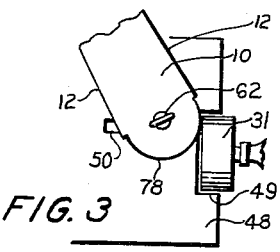
Figure 3 is a fragmentary top plan view showing a saw bar supported on one of the work surfaces and in engagement with a grinding wheel in an initial reconditioning step.
Figure 1:
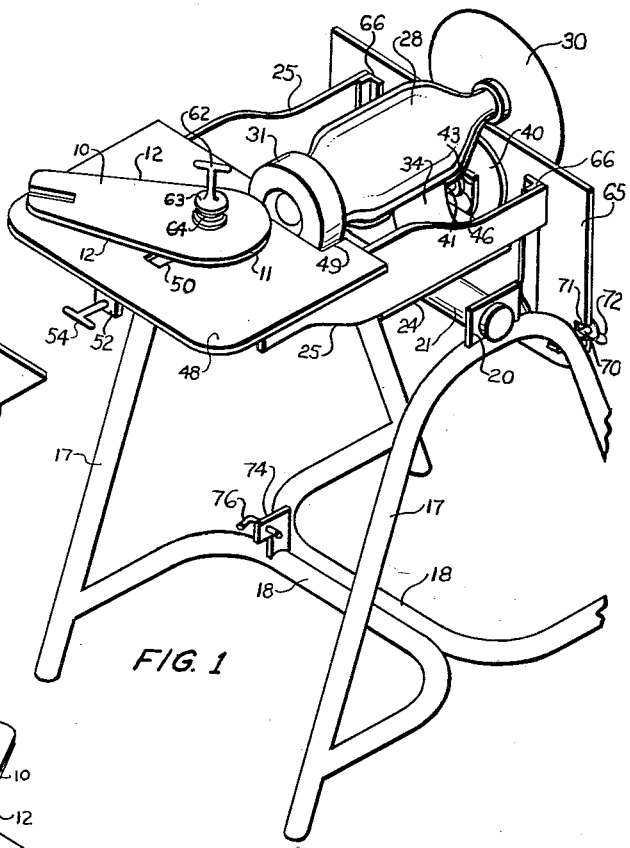
Figure 1 is a perspective view of the present machine showing one operative position thereof for performing an initial reconditioning step on a chain saw bar.
Figure 2:
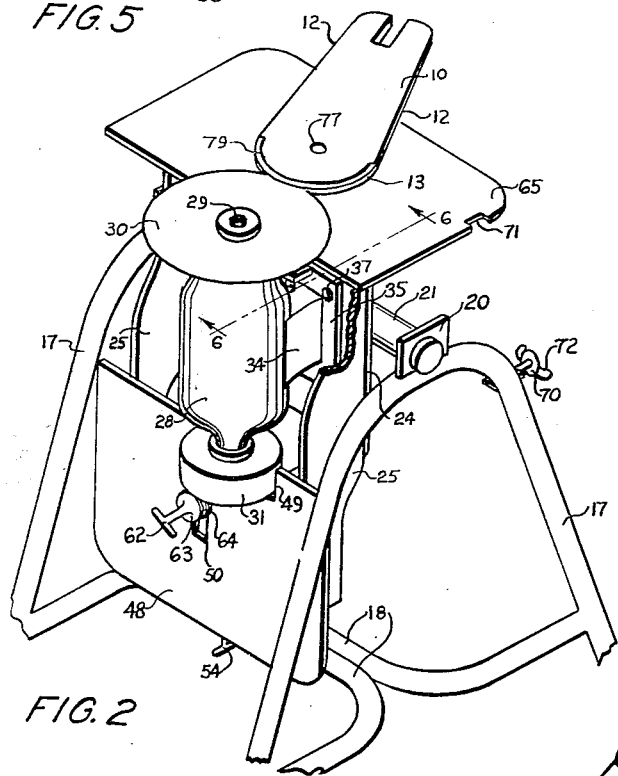
Figure 2 is a perspective view of the apparatus showing a second operative position thereof.

The apparatus of the present invention comprises a machine for reconditioning chain saw bars 10 of the type shown in Figures 1, 2 and 3. These bars may vary in length, but all are provided with one rounded end portion 11, Figure 1, and straight side portions 12. The two side edges and arcuate end of the bar are provided with a groove 13, Figure 2, and lugs on the chain saw are guided in said groove in the saw bar to guide the saw therearound when the saw is in operation, the chain riding on the top edges of the groove rails which form tracks therefor.

The reconditioning machine disclosed herein has a supporting framework comprising a pair of inverted U-shaped standards 17 and reinforcing cross members 18. Secured to the standards 17 are bearings 20 in which is journaled a shaft 21, and fixedly secured to the shaft 21 is a base plate 24 to which is secured spaced side plates 25. Plates 24 and 25 constitute a base unit. Base plate 24 supports an electric motor 28 of the type having a double ended shaft 29, Figures 2 and 6. Mounted on one end of the motor shaft 29 is a first grinding wheel 30 comprising a thin disc or saw, and mounted on the other end of the shaft 29 is a second grinding wheel 31 comprising preferably a cup wheel grinder. The motor 28 is secured to a motor mount 34, shown in detail in Figure 6, having a flanged base portion 35 engaging base plate 24.

It is desirable for reasons to be hereinafter explained that the motor be adjustable in a direction longitudinally of its shaft, and to accomplish this function the base plate 24 is provided with slots 36, shown in dotted lines in Figure 6, to receive bolts 37 extending through the flanged base portion 35 of the motor mount 34. Wing nuts 38 are threaded on the bolts 37, and, when tightened, clamp the motor mount in a fixed position relative to the base plate 24. When wing nuts 38 are loosened, the motor and its mount can be moved in a direction longitudinally of its shaft. Accurate adjustment of the position of the motor is accomplished by a hand wheel 40, best seen in Figure 6, secured to a stud 41 journaled in a bracket 43 on the base plate 24. The free end of stud 41 engages a tapped bore in a lug 44 on the base portion 35 of motor mount 34. Collars 45 and 46 are mounted on the stud 41 on each side of the bracket 43 to prevent axial movement of the stud. To adjust the motor in a direction longitudinally of its shaft, the wing nuts 38 are first loosened and the hand wheel 40 rotated in a desired direction to move the lug 44 along the stud 41. As the base portion 35 slides on base plate 24, bolts 37 move in slots 36, and when the desired adjustment is obtained the wing nuts 38 on bolts 37 are tightened to hold the motor and its mount in a fixed position relative to the base plate 24.

Figure 4:
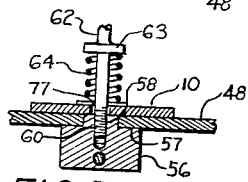
Figure 4 is a perspective view of the underside of one of the work tables showing means for adjustably holding a saw bar on the work table.

Secured to the side plates 25 is a work table 48 having a notch 49 in one edge adapted to receive the grinding wheel 31. An elongated slot 50 is provided in the surface of the table, the slot extending in a direction parallel to the axis of the motor shaft 29. Secured to the underside of the table 48, Figure 4, is a pair of spaced blocks 52 and 53. Journaled in the blocks 52 and 53 is an adjusting screw 54 having one end projecting beyond an edge of the table so as to be within reach of the operator, the screw 54 being spaced directly beneath the slot 50 in the table. Threadedly mounted on the screw 54 is a guide block 56 notched on its upper edge at 57 to form a tongue 58 which engages slot 50 on which is adapted to slide longitudinally of the slot upon rotation of adjusting screw 54.

Figure 5:
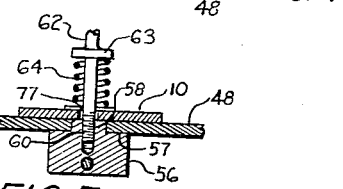
Figure 5 is a sectional view taken on the line 5—5 of Figure 4.

As best seen in Figure 5, the upper surface of the guide block 56 is provided with a tapped bore 60 which receives a threaded post 62. Post 62 is flanged at 63 and carries a spring 64 beneath said flange. As best seen in Figure 1, a saw bar 10 is adapted to be pivotally mounted on the post 62 and held flat on the work table 48 by spring 64, the amount of compression exerted by the spring being varied by the amount of threaded engagement of post 62 with the bore 60.

Secured to the side plates 25 is a second work table 65, this table being secured to the plates 25 by means of angle irons 66, Figure 1, welded to the plates 25 and table 65. Table 65 is mounted in a plane at right angles to table 48 and is disposed in relation to the grinding wheel 30 so that an edge of a saw bar supported on top of the table can be brought into engagement with the grinding wheel 30 as shown in Figure 2.

Figure 6:
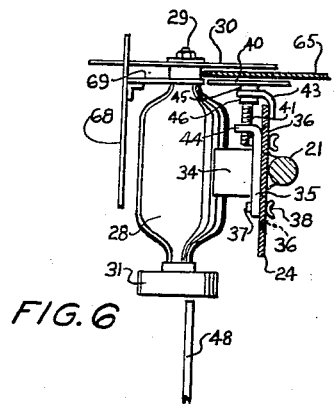
Figure 6 is a sectional view taken on the line 6—6 of Figure 2 showing the adjusting means for moving the motor and grinders in a direction longitudinally of the motor shaft.

A third work table 68, shown only in Figure 6, is provided and is secured to the motor housing by means of a plate 69. Table 68 has a work surface in a plane at right angles to table 65 and is notched to receive the grinding wheel 30. Work supported on this table can be moved into engagement with grinding wheel 30 whereby the grinding wheel 30 can be used as a cutoff wheel for trimming portions of the saw bar or for shortening and remodeling old types of bars.

The entire mechanism carried on the shaft 21 is rotatable with the shaft to two operative positions. Figure 1 shows one operative position wherein the work table 48, as well as the table 68, is in a hortizontal plane. The mechanisoi is held in this position by means of a catch bolt 70 pivotally mounted on one od the end frames 17 and adapted to engage a notch 71 in the edge of table 65. A wing nut 72 is threaded on catch bolt 70 and is adapted to engage the table 65 and hold it in the Figure 1 position. Figure 2 shows the other position of the mechanism rotated ninety degrees in a counterclockwise direction as viewed in Figures 1 and 2. The center of gravity of the mechanism is offset from shaft 21 toward the grinding wheel 31 and the mechanism will rotate to the Figure 2 position by the force of gravity and remain in such position while the work table 65 is in use. If desired, however, latch plates 74 and 75 secured to the stationary frame 18, Figure 1, and to the undersurface of work table 48, Figure 4, respectively, are provided with apertures adapted to be in alignment when the mechanism is in its Figure 2 position to receive a latch pin 76 and positively hold the mechanism in its Figure 2 position.

Although not shown on the drawings, suitable shatterproof glass shields or metal guards are provided in conjunction with the grinding wheels.

To recondition a saw bar 10 on the present machine, the mechanism is rotated to its Figure 1 position and held in such position by catch bolt 70 whereby work table 48 is in a horizontal plane. The saw bar is mounted on post 62, and for this purpose it may be necessary to bore a hole 77 through the saw bar, if such a hole is not already provided therein, to receive post 62, hole 77 being located in a position substantially in the center of the arc at the rounded end of the saw bar. Post 62 is threaded in block 56 to serve as a pivot for the saw bar, the spring 64 engaging the saw bar to hold it flat on the table 48.

When the rounded end portion 11 of the saw bar 10 has become worn or damaged, or the top edges of the rails therearound have worn unevenly, the first operation to be performed comprises grinding a circular notch 78, Figure 3, in said rounded end portion. With the saw bar mounted on the post 62, adjusting screw 54 is rotated so as to bring the rounded end of the saw bar into engagement with the grinding wheel 31. The saw bar is pivoted back and forth through approximately 180 degrees to grind the notch 78 in the rounded end of the bar, the screw 54 being rotated after each pivotal movement of the saw bar to move the bar into the grinding wheel 31 until the notch is of a desired depth.

The saw bar is then removed from post 62 and notch 78 is filled with a hard weld metal 79, Figure 2, by any suitable welding process. If necessary, the saw bar is again mounted on post 62 and the rough edges of the deposited weld metal ground off with grinding wheel 31 to make a smooth rounded end portion.

The next operation comprises reestablishing the groove in the rounded end of the bar 10. Catch bolt 70 is released and the mechanism rotated to its Figure 2 position, whereby the work table 65 is in a horizontal position. The saw bar is supported in a flat position on the table 65 in engagement with disc grinder 30, as shown in Figure 2, and is rotated through approximately 180 degrees to cut said groove. The operator can skillfully perform this operation of cutting the groove without pivot guide means.

The thickness of different saw bars may vary, and the thickness of one wall of the groove relative to the other wall of the groove may likewise vary, and, therefore, to recut a groove around the end 11 of the bar in alignment with the established groove it is necessary to adjust the motor 28 in an axial direction to move the grinder 30 toward or away from the surface of table 65. This function is accomplished by loosening wing nuts 38 and rotating hand wheel 40 in the direction desired and then resetting the wing nuts.

In the reconditioning of saw bars it may sometimes be necessary to replace broken or sheared portions thereof. In this respect, the saw bar is supported in a flat position on work table 48, with the mechanism in its Figure 1 position, and moved into engagement with grinder 30. Grinder 30 can then be used as a cutoff grinder for cutting a straight edge to which replacement metal pieces may be welded.

Having now described my invention and in what manner the same may be used, what I claim as new and desire to protect by Letters Patent is:

1. A machine for performing a plurality of reconditioning steps on a work piece comprising a powered shaft having a grinding wheel on each end thereof, a work supporting surface adjacent each of said grinding wheels for supporting a work piece in position to be moved into engagement with one of said grinding wheels, and means on said machine for moving each said work supporting surface and grinding wheel as an integral unit from an inoperative position to an operative position to provide a horizontal work supporting surface for operations performed on said work piece by each grinding wheel.

2. A machine for performing a plurality of reconditioning steps on a chain saw bar comprising a power unit having a double ended shaft, a grinding wheel mounted on each end of said shaft, a work supporting surface adjacent each said grinding wheel for supporting a saw bar in engagement with said grinding wheel, said work supporting surfaces being mounted in planes at right angles to each other, and means on said machine for moving each said work supporting surface and grinding wheel as an integral unit from an inoperative position to an operative position to provide a horizontal work supporting surface for operations performed on the saw bar by each grinding wheel.

3. A machine for performing a plurality of reconditioning steps on a work piece comprising a supporting framework, a single powered shaft supported by said framework, a grinding wheel mounted on each end of said shaft, a work table adjacent one of said grinding wheels having a work supporting surface in a plane parallel with the axis of said shaft, a work table adjacent said other grinding wheel having a work supporting surface in a plane normal to the axis of said shaft, each said grinding wheel and adjacent work supporting surface being rotatable on said framework as an integral unit from a non-working position to a working position to provide a horizontal work supporting surface for operations to be performed on said work piece by each grinding wheel.

4. A machine as defined in claim 3 further including a third work table adjacent said other grinding wheel having a work supporting surface in a plane parallel with said first work table.

5. A machine as defined in claim 3 further including a horizontal shaft mounted in bearings on said supporting framework, and a base unit secured to said shaft, said powered shaft and work tables being mounted on said base unit for rotation in said bearings between said working and non-working positions.

6. A machine as defined in claim 5, said base unit, powered shaft and work tables having a center of gravity offset from said horizontal shaft to rotate said powered shaft and work tables to one of said positions by gravity, and latch means on said supporting framework for holding said powered shaft and work tables in said other position.

7. A machine for performing a plurality of reconditioning steps on a chain saw bar comprising a supporting framework, a single powered shaft supported on said framework, a grinding wheel on one end of said shaft, a grinding wheel on the other end of said shaft, a first work table adjacent the first grinding wheel having a work supporting surface in a plane parallel with the axis of said power shaft, a second work table adjacent the second grinding wheel having a work supporting surface in a plane normal to the axis of said power shaft, each said grinding wheel and adjacent work supporting surface being rotatable on said framework as an integral unit from a non-working position to a working position to provide a horizontal work supporting surface for operations to be performed on said saw bar by each grinding wheel, means on at least one work supporting surface for pivoting said saw bar about the center of the arc of its rounded end, and means for adjusting said pivot relative to said grinding wheel.

8. A machine for reconditioning chain saw bars comprising a supporting framework, a power unit on said framework and having a double ended shaft, a grinding wheel on each end of said shaft, a work table adjacent one of said grinding wheels and having a work supporting surface in a plane parallel with the axis of said shaft, a work table adjacent said other grinding wheel and having a work supporting surface in a plane normal to the axis of said shaft, each said grinding wheel and adjacent work supporting surface being rotatable on said framework as an integral unit from a non-working position to a working position to provide a horizontal work supporting surface for operations to be performed on said saw bar by each grinding wheel, and means providing for longitudinal adjustment of said shaft to adjust the positions of said grinding wheels relative to said work supporting surfaces.

9. A grinding machine comprising a grinding wheel, a work table mounted adjacent said grinding wheel and having a work supporting surface for supporting a work piece thereon, a post on said work supporting surface to serve as a pivot for a work piece, means for moving said post in a direction parallel with the longitudinal axis of said shaft to carry said work piece into and out of engagement with said grinding wheel, and a spring on said post for pressing said work piece flat against said surface.

10. A grinding machine comprising a powered shaft carrying a cup wheel grinder and disc grinder, a first work table mounted adjacent said cup wheel grinder and having a work supporting surface for supporting a work piece thereon, a post on said work supporting surface to serve as a pivot for said work piece, means in said work table to move said post in a direction parallel with the axis of said shaft to move said work piece into and out of engagement with said cup wheel, a second work table mounted adjacent said disc grinder and disposed at right angles to said first work table, said grinders and work supporting surfaces being movable as an integral unit between two positions to provide a horizontal work surface for each operation to be performed on said saw bar.

References Cited in the file of this patent
UNITED STATES PATENTS

| 663,391 | Orbison | Dec. 4, 1900 |
| 740,263 | Fisher | Sept. 29, 1903 |
| 1,145,194 | Hansen | July 6, 1915 |

FOREIGN PATENTS

| 413,430 | Germany | Aug. 24, 1924 |